United States Patent Office 2,758,992

Patented Aug. 14, 1956

1

2,758,992

HEXADECAHYDRO-17-(δ-HYDROXYL-α-METHYLBUTYL)-10,13-DIMETHYL-15H-CYCLOPENTA[A]PHENANTHRENE-3,7,12-TRIONE AND DERIVATIVES THEREOF

Robert H. Mazur, Evanston, Ill., assignor, by mesne assignments, to G. D. Searle & Co., Skokie, Ill., a corporation of Delaware No Drawing. Application March 14, 1955, Serial No. 494,234

6 Claims. (Cl. 260—239.55)

This invention relates to hexadecahydro-17-(δ-hydroxy-α - methylbutyl) - 10,13 - dimethyl - 15H - cyclopenta-[a]phenanthrene-2,7-12-trione, its esters and cyclic ketals, and to processes for the manufacture thereof. More particularly, this invention relates to compounds of the formula

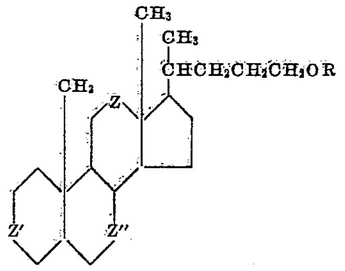

wherein R is either hydrogen or a lower alkanoyl radical; and Z, Z′ and Z″ are each carbonyl radicals or 1,3-oxathiolane radicals of the formula

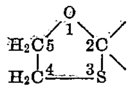

in which the carbon atom at position 2 is a so-called "spiro" atom, being uniquely common to both the oxathiolane and (one of the) cyclopenta[a]phenanthrene rings. By "lower alkanoyl" is meant

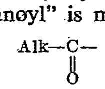

wherein Alk is defined as an alkyl group containing fewer than 7 carbon atoms.

The compounds of this invention possess valuable pharmacological properties. Especially, the subject compounds are useful because of their regulatory effect on the cardiovascular system. For example, they are of particular importance as anti-hypertensive agents. Moreover, the compounds disclosed herein manifest a myotrophic activity uncomplicated by the capacity for testoid stimulation which characterizes the naturally occurring substances known to increase muscle strength and mass. Still further, the claimed compounds possess a desirable choleretic action. Distinct from cholagogs, which merely promote the expulsion of stored bile from the gall bladder, the subject materials have the property of augmenting the volume output of bile from the liver.

The compound of this discovery are relatively insoluble in water but may be dissolved in alcohol, dioxane, and other common organic solvents. The compounds may be administered in solid form as tablets or capsules; dissolved or suspended in aqueous media, they may be given parenterally.

The compounds to which this invention relates may be prepared from a suitable oxygenated cyclopenta[a]phenanthrene—by way of example, dehydrocholic acid—as follows: Dehydrocholic acid is reacted with β-mercaptoethanol in the presence of an acidic condensing agent such as zinc chloride or p-toluenesulfonic acid to produce, upon saponification of the primary product, the corresponding cyclic ketal (3,7,12). This material is converted to a simple ester, as with diazomethane, which ester, in turn, is reduced with lithium aluminum hydride or the equivalent to give the δ-hydroxy derivative. It is then possible to effect selective hydrolysis of the three cyclic ketal groups present in the molecule so as to afford the mono-, di-, and triketo alcohols corresponding. Thus, treatment with (in effect) very dilute alcoholic hydrogen chloride yields the 3-oxo-17,12-ketal, while sulfuric acid in aqueous dioxane gives a separable mixture of the 3,7-dioxo-12-ketal and the trione. An alternative, ofttimes preferable route to the aforesaid trione proceeds from the 3,7,12-ketal by heating with acetic acid containing a small amount of hydrochloric acid and saponifying the triketo-δ-ester which results. Other δ-esters of the trione in question are obtained by contacting the parent alcohol with an acid anhydride of choice in the presence of a basic catalyst such as pyridine. These esters, in turn, may be converted to corresponding ketals with β-mercapto-ethanol as above.

Inasmuch as the reactivities of the keto groups of dehydrocholic acid are known to decrease in the order 3>7>12, particular structures assigned the hereinafter claimed ketals are highly probable albeit not proved. For present purposes, however, structural ambiguities would be nowise detrimental, since the burden of the present disclosure is compounds useful by reason of the physiological properties inhering therein, regardless of structure, and means whereby they may be prepared.

The following examples will illustrate in detail certain of the compounds which constitute the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees Centigrade (° C.) and relative amounts of materials in parts by weight, except as otherwise noted. Specific rotations refer to the D line of sodium and were determined in dioxane solution at room temperature.

EXAMPLE 1

*Hexadecahydro - 17 - (γ - carboxy - α - methylpropyl) - 10,13 - dimethyl - trispiro[15H - cyclopenta[a]phenanthrene - 3,2′ - (1′,3′)oxathiolane - 7,2″ - (1″,3″) - oxathiolane-12,2‴-(1‴,3‴)oxathiolane].*—A mixture of 82 parts of dehydrocholic acid, 88 parts of β-mercaptoethanol, and 1 part of p-toluenesulfonic acid monohydrate in 1565 parts of toluene is heated at reflux temperatures for 18 hours, water being removed as formed in process. Toluene is then distilled off and the residue dissolved in 725 parts of 90% (v./v.) aqueous methanol containing 80 parts of potassium hydroxide. The solution is heated at reflux temperatures for 2 hours, following which it is poured into an excess of cold dilute muriatic acid. The product is extracted with benzene. Concentration of the benzene extract and subsequent dilution with methanol effects, on cooling, precipitation of the desired cyclic ketal. A second crop of product is obtained by dilution of the mother liquor with additional methanol. Recrystallization of the material thus obtained from a mixture of benzene and methanol gives long needles which sinter in the neighborhood of 150° C. and melt at approximately 155° C. The product shows a specific rotation of +92°. It has the formula

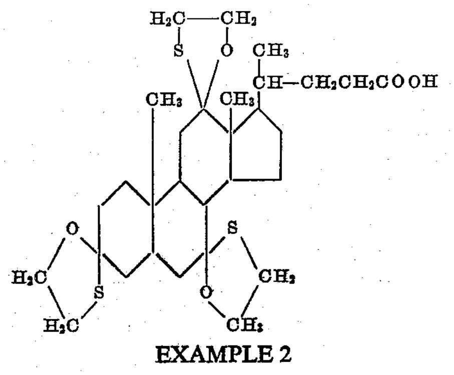

EXAMPLE 2

*Hexadecahydro - 17 - (γ - methoxycarbonyl - α - methylpropyl) - 10,13 - dimethyl - trispiro[15H - cyclopenta - [a]phenanthrene - 3,2′ - (1′,3′)oxathiolane - 7,2″ - (1″,3″)oxathiolane - 12,2‴ - (1‴,3‴)oxathiolane].*—The product of the foregoing Example 1 is converted to the corresponding methyl ester by treatment with an excess of diazomethane in ether solution. Solvent having been distilled off, the residue is crystallized from methanol as small, feathery needles of the above-named ester, sintering at 177° C. and melting at approximately 183° C. The product has a specific rotation of +90°.

EXAMPLE 3

*Hexadecahydro - 17 - (δ - hydroxy - α - methylbutyl)- 10,13 - dimethyl - trispiro - [15H - cyclopenta[a]phenanthrene - 3,2′ - (1′,3′)oxathiolane - 7,2″ - (1″,3″) - oxathiolane-12,2‴-(1‴,3‴)oxathiolane].*—A solution of 155 parts of the ester of the foregoing Example 2 in 3500 parts of anhydrous ether is added very slowly with agitation to a suspension of 19 parts of lithium aluminum hydride in 1400 parts of anhydrous ether. The resultant mixture is heated at reflux temperatures for 2 hours and then allowed to stand overnight. To the mixture is cautiously added with agitation 1000 parts of approximately 10% aqueous sulfuric acid. The ether layer is separated, dried over anhydrous sodium sulfate, and stripped of solvent by distillation, leaving a residue which, twice recrystallized from a mixture of benzene and methanol, appears as needles, M. P. 233–235° C., specific rotation +95°. The desired product thus obtained has the formula

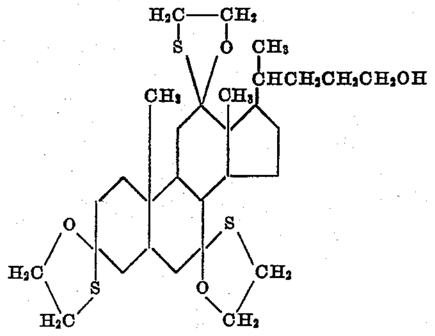

EXAMPLE 4

*Hexadecahydro - 17 - (δ - hydroxy - α - methylbutyl) - 10,13 - dimethyl - dispiro[15H - cyclopenta[a]phenanthrene - 7,2′ - (1′,3′)oxathiolane - 12,2″ - (1″,3″) - oxathiolane] - 3 - one.*—A solution of 20 parts of the alcohol of the preceding Example 3 in 1200 parts of anhydrous methanol containing 33 parts of acetyl chloride is heated at reflux temperatures for 5 hours. Methanol is then distilled off and the residue taken up in ether. The ether solution is washed with aqeuous sodium bicarbonate, dried over anhydrous sodium sulfate, and chromatographed on silica, using ethyl acetate and benzene as developing solvents. The purified product, twice crystallized from a mixture of benzene and cyclohexane, shows M. P. approximately 212–214° C. and a specific rotation of +43°. The desired material is thus obtained as thick needles and has the formula

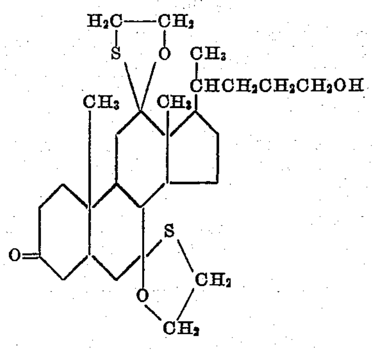

EXAMPLE 5

A. *Hexadecahydro-17-(δ-hydroxy-α-methylbutyl)-10,-13 - dimethyl - 15H - cyclopenta[a]phenanthrene - 3,7,12-trione.*—A solution of 7 parts of the alcohol of Example 3 in 315 parts of dioxane containing 35 parts of water and 15 parts of concentrated sulfuric acid is heated at reflux temperatures for 22 hours, then neutralized with solid sodium bicarbonate and, finally, filtered. The filtrate is stripped of solvent by vacuum distillation and the residue taken up in methanol. A crystalline precipitate (crop 1) comes down on standing. The precipitate is filtered off for subsequent purification and the mother liquor then evaporated to dryness. The residue is taken up in 13 parts of benzene and this solution diluted with 5 volumes of ether. A crystalline precipitate (crop 2) forms in process. This precipitate is filtered off, combined with crop 1, and the material thus accumulated crystallized from methanol. There results hexadecahydro-17-(δ-hydroxy-α-methylbutyl)-10,13 - dimethyl - 15H-cyclopenta[a]phenanthrene,3,7,12-trione, M. P. 212–213° C., specific rotation +28°, the formula of which is

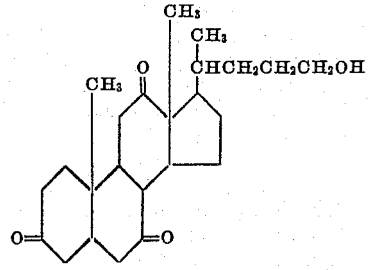

B. *Hexadecahydro-17-(δ-hydroxy-α-methylbutyl)-10,-13-dimethyl-spiro[15H-cyclopenta[a]phenanthrene-12,2′-(1′,3′)oxathiolane]-3,7-dione.*—The mother liquor from crop 2 in the preceding Part A of this example is evaporated to dryness and the residue washed by trituration with ether. Washings are discarded and the dried residue twice crystallized from methanol. By this means there is obtained the desired monoketal, M. P. 182–183° C., specific rotation +57.5°. The product has the formula

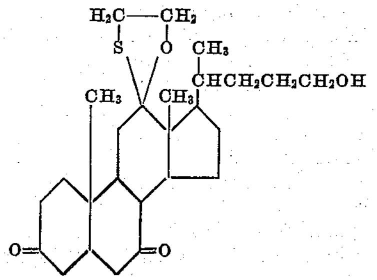

EXAMPLE 6

*Hexadecahydro-17-(δ-acetoxy-α - methylbutyl) - 10,13-dimethyl - 15H - cyclopenta[a]phenanthrene - 3,7,12 - trione.*—A. A solution of 1 part of hexadecahydro-17-(δ-hydroxy-α-methylbutyl)-10,13-dimethyl - 15H - cyclopenta [a]phenanthrene-3,7,12-trione in 10 parts of pyridine and 6 parts of acetic anhydride is allowed to stand overnight at room temperatures. The solution is then diluted with a 1:1 (by volume) mixture of ether and benzene, and the diluted solution washed in turn with aqueous acid, aqueous alkali, and water, following which it is dried over anhydrous sodium sulfate and, finally, concentrated by distillation to a relatively small volume. Upon addition of anhydrous ether, the desired acetoxyl compound crystallizes as fine needles, M. P. approximately 203–204° C. Specific rotation is +26°. The product has the formula

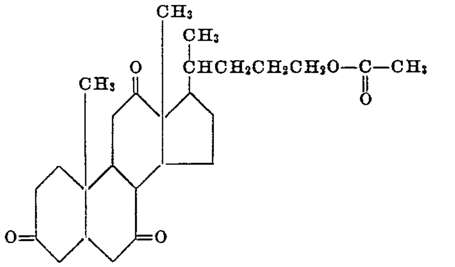

B. To a solution of 2 parts of the ketal alcohol of the hereinabove detailed Example 3 in 50 parts of glacial acetic acid is added 1 part of concentrated muriatic acid, following which the reactants are heated at reflux temperatures for 22 hours. Acetic acid is removed by vacuum distillation and the residue washed by trituration with ether. The dried residue, crystallized from a mixture of benzene and normal hexane, gives fine needles of hexadecahydro-17-(δ-acetoxy-α-methylbutyl)-10,13-dimethyl-15H - cyclopenta[a]phenanthrene,3,7,12-trione identical with the product obtained in Part A preceding.

EXAMPLE 7

*Hexadecahydro-17-(δ-valeryloxy-α-methylbutyl)-10,13-dimethyl - 15H - cyclopenta[α]phenanthrene - 3,7,12 - trione.*—By substituting 11 parts of valeric anhydride for the 6 parts of acetic anhydride used in the procedure of Example 6A above, hexadecahydro-17-(δ-valeryloxy-α-methylbutyl)10-13-dimethyl-15H-cyclopenta[a]phenanthrene-3,-7,12-trione is obtained. The product has the formula

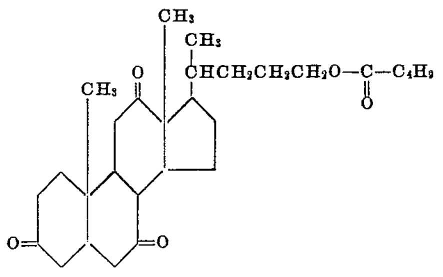

What is claimed is:

1. A compound having the formula

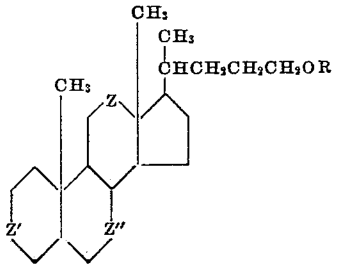

wherein R is selected from the group consisting of hydrogen and lower alkanoyl radicals; and Z, Z′, and Z″ are selected from the group consisting of carbonyl radicals and 1,3-oxathiolane radicals having the formula

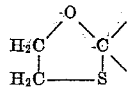

in which the carbon atom at position 2 is a spiro atom uniquely common to both the oxathiolane and cyclopenta[a]phenanthrene rings.

2. Hexadecahydro - 17 - (δ - hydroxy - α - methylbutyl) - 10,13 - dimethyl - trispiro[15H - cyclopenta[a]-phenanthrene - 3,2 - (1′,3′)oxathiolane - 7,2″ - (1″,3″)-oxathiolane-12,2‴-(1‴,3‴)oxathiolane].

3. Hexadecahydro - 17 - (δ - hydroxy - α - methylbutyl) - 10,13 - dimethyl - 15H - cyclopenta[a]phenanthrene-3,7,12-trione.

4. Hexadecahydro - 17 - (δ - acetoxy - α - methylbutyl) - 10,13 - dimethyl - 15H - cyclopenta[a]phenanthrene-3,7,12-trione.

5. In a process for preparing compounds of the formula

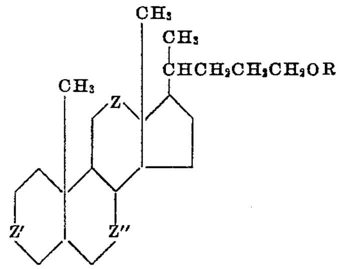

wherein R is selected from the group consisting of hydrogen and lower alkanoyl radicals; and Z, Z′, and Z″ are selected from the group consisting of carbonyl radicals and 1,3-oxathiolane radicals having the formula

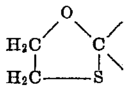

in which the carbon atom at position 2 is a spiro atom uniquely common to both the oxathiolane and cyclopenta-[a]phenanthrene rings, the step which comprises contacting hexadecahydro - 17 - (γ - alkoxycarbonyl-α - methylpropyl) - 10,13 - dimethyl - trispiro[15H-cyclopenta[a]phenanthrene - 3,2′ - (1′,3′)oxathiolane-7,2″ - (1″,3″)oxathiolane - 12,2‴ - (1‴,3‴)oxathiolane] with lithium aluminum hydride.

6. In a process for preparing compounds of the formula

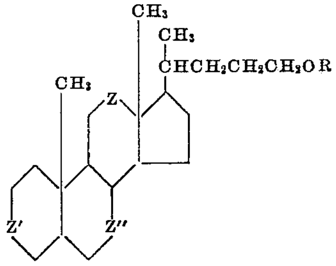

wherein R is selected from the group consisting of hydrogen and lower alkanoyl radicals; and Z, Z′, and Z″ are selected from the group consisting of carbonyl radicals and 1,3-oxathiolane radicals having the formula

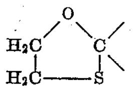

in which the carbon atom at position 2 is a spiro atom uniquely common to both the oxathiolane and cyclopenta-[a]phenanthrene rings, the step which comprises contacting hexadecahydro - 17 - ($\gamma$ - methoxycarbonyl- $\alpha$ - methylpropyl) - 10,13 - dimethyl - trispiro[15H-cyclopenta[a]phenanthrene - 3,2′ - (1′,3′)oxathiolane-7,2″ - (1″,3″)oxathiolane - 12,2‴ - (1‴,3‴)oxathiolane] with lithium aluminum hydride.

No references cited.